June 26, 1928. 1,675,109
R. V. KELLY
PISTON RING
Filed May 21, 1927
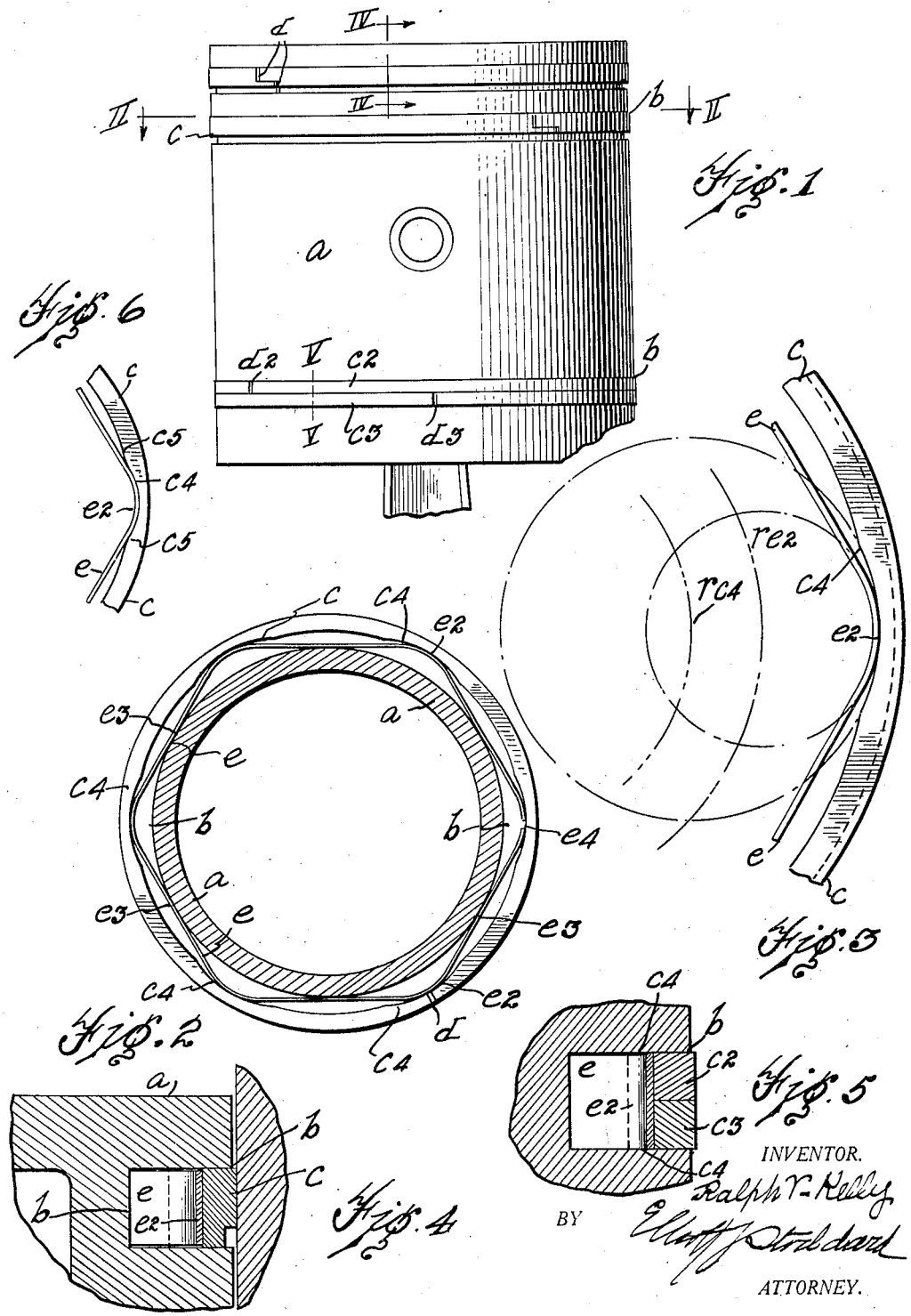
INVENTOR.
Ralph V. Kelly
BY Elliott Stoddard
ATTORNEY.

Patented June 26, 1928.

1,675,109

UNITED STATES PATENT OFFICE.

RALPH V. KELLY, OF DETROIT, MICHIGAN.

PISTON RING.

Application filed May 21, 1927. Serial No. 193,132.

My invention relates to piston rings and an object of my improvements is to provide an improved spring-pressed ring construction in which the spring shall be more durable and other advantages, hereinafter specified, may be incidentally secured.

In the accompanying drawing:

Figure 1 is an elevation of a piston having single rings in its upper grooves and showing two coaxial rings in the lower groove.

Figure 2 is a section on the line II, II, Figure 1.

Figure 3 is a plan view to an enlarged scale of a portion of a ring and the adjacent spring, together with a diagram illustrating the construction of these parts.

Figure 4 is a detail section on the line IV, IV, Figure 1.

Figure 5 is a detail section on the line V, V, Figure 1.

Figure 6 is a detail plan view of a portion of a ring and adjacent portion of the pressure ring showing a modified construction.

$a$ is a piston having the ring grooves $b$, $b$ therein. $c$ represents the single ring in an upper groove $b$. $c^2$ and $c^3$ are the rings constituting the double ring in the lower groove. $d$ is the split separating the ends of the ring $c$ and $d^2$, $d^3$ indicates the similar splits in the rings $c^2$, $c^3$.

$c$ is a hexagonal spring with its corners rounded, as hereinafter described. The ends of this spring are separated by the slot $e^4$. $c^4$ indicates each of six grooves formed at equal intervals in the inner surface of the ring $c$. The grooves $c^4$ are arcs of circles in the plane of the ends of the same length of radius, as for instance the radii of circles whose centers are upon radii of the ring $c$ and upon a circle $rc^4$, Figure 3, concentric with the ring $c$. The rounded corners $e^2$ of the spring $e$ are also arcs of circles, the radii of which are on the radii of the ring $c$ and upon a circle $re^2$, Figure 3, concentric with the ring $c$ and of less diameter than the circle $rc^4$ so that the radii of the arcs of the spring are less than the radii of the arcs of the groove $c^4$. The rounded corners $e^2$ of the spring $e$ bearing the grooves $c^4$ in the inner surface of the ring $c$, as shown. The split in the ring comes at a groove $c^4$ in which the spring $e$ is continuous and the split in the spring $e$ comes in a groove $c^4$ of the ring $c$, the walls of which are continuous. The corners of the spring $e$ are connected by approximately straight portions which bear at their center against the bottom of the piston groove, as shown at $e^3$.

By this construction I obtain a broad bearing surface for the corners $e^2$ of the spring $e$ so that the spring does not wear as rapidly at these points of contact. The arcs of the outer surface of the spring corner having only slightly less curvature than the surface of the groove $c^4$. I also obtain more room for the functioning of the spring $e$ between the bottom of the piston and the inner surface of the ring $c$. A rounded corner $e^2$ fits into a groove $c^4$ where the ring $c$ is divided and covers up the slot that separates the ends of the ring so as to prevent leakage through the slot. Where two rings are employed, as $c^2$, $c^3$, Figure 5, the engagement of the corners $e^2$ in the slot $e^4$ hold the two rings from relative angular movement, so that the opening $d^2$, $d^3$ between the ends of said ring cannot come together. The grooving of the ring $c$ makes the same more flexible so that it will more easily adapt itself to the shape of the cylinder and respond more perfectly to the pressure of the spring $e$, while practically retaining its strength and wearing qualities.

While I have shown and described a hexagonal spring and a corresponding construction of the ring, of course any number of corners may be employed and the ring grooved to correspond.

In Figure 6 I have shown a modified construction in which the groove $c^4$ in the piston ring and the contiguous portion of the spring have the same radius of curvature. In this case the ring is rounded off at $c^5$ where the curvature of the groove meets the curve of the interior surface of the ring.

What I claim is:

1. The combination of a ring having a vertical groove in its inner surface and a pressure ring having a surface shaped to the surface of said groove and engaging therein.

2. The combination of a ring having a vertical arcuate groove in its inner surface and a pressure ring having an arcuate surface of slightly greater curvature engaging in said groove.

3. The combination of a piston having a ring groove therein, a ring in said groove, a polygonal spring in said groove having corners, said ring being provided with vertical grooves in its inner surface, said corners of the spring being shaped to the surfaces of said grooves and engaging therein.

4. The combination of a piston having a ring groove therein, a ring in said groove, a polygonal spring in said groove having arcuate corners, said ring being provided with arcuate grooves in its inner surface of slightly less curvature than the corners of said spring in which said corners engage.

5. The combination of a ring having a vertical groove in its inner surface and a pressure ring having a surface shaped to the surface of said groove and engaging in said groove, said ring being cut through at the point of engagement of the surface of said spring.

6. The combination of two split rings lying one upon the other so that the split in said rings shall not register, registering vertical grooves in the inner surface of said rings and a pressure ring engaging in both of said grooves.

7. In a piston ring construction the combination of a ring having arcuate grooves in its inner surfaces spaced from each other around said ring making the ring thinner where said grooves are formed and a pressure spring engaging in each of said grooves, said spring having an arcuate surface of somewhat greater curvature than said groove.

In testimony whereof, I sign this specification.

RALPH V. KELLY.